Aug. 7, 1956 G. A. LYON 2,757,980

WHEEL STRUCTURE

Filed Sept. 23, 1953 2 Sheets-Sheet 1

Inventor
GEORGE ALBERT LYON by Hill, Sherman, Meroni, Gross & Simpson Attys.

Aug. 7, 1956 G. A. LYON 2,757,980

WHEEL STRUCTURE

Filed Sept. 23, 1953 2 Sheets-Sheet 2

Inventor
GEORGE ALBERT LYON by Hill, Sherman, Meroni, Gross + Simpson
Attys.

United States Patent Office 2,757,980

Patented Aug. 7, 1956

2,757,980

WHEEL STRUCTURE

George Albert Lyon, Detroit, Mich.

Application September 23, 1953, Serial No. 381,826

4 Claims. (Cl. 301—37)

This invention relates to a wheel cover and more particularly to a spoke or louvre type cover wherein portions of the cover punched out to form the louvres form cover retaining elements to cooperate with the wheel.

An object of this invention is to provide a simplified wheel cover having ornamental spokes and louvres and wherein portions alternating with the spokes comprise cover retaining means.

In accordance with the general features of this invention there is provided a wheel cover having spaced ornamental spokes or louvres alternating with rearwardly deflected portions punched from the cover to form the spokes and each being turned and angled into a cover retaining finger.

In accordance with other features of this invention there is provided in a wheel structure including a wheel having a tire rim with generally radial and axial flanges, a circular cover member for the wheel comprising generally divergent circular parts and with circumferentially spaced portions thereof punched therefrom and turned axially rearwardly at the reinforcing junction of the parts leaving openings in the cover member alternating with spoke simulating louvre portions, each of the punched portions being turned radially outwardly back upon itself into a resilient cover retaining finger each with a rearwardly disposed bend adapted to bottom against a radial rim flange and an axially outwardly extending resilient leg terminating in a relatively short and stiff terminal extending radially and axially outwardly for gripping engagement with an axial rim flange, the axial leg being resiliently deflectible upon engagement with the rim flange and against the backing of the rigidifying junction of the cover member proper.

Another feature of the invention relates to the louvre or spoke portions being transversely skewed forming axially outer spaced air pick-up edges.

Yet, another feature of the invention relates to the louvre or spoke portions being generally of serpentine cross-sectional contour and having an axially outwardly deflected air pick-up edge.

Other objects and features of this invention may more fully appear from the following detailed description taken in connection with the accompanying drawings which illustrate a single embodiment thereof and in which.

As shown on the drawings.

Figure 2:
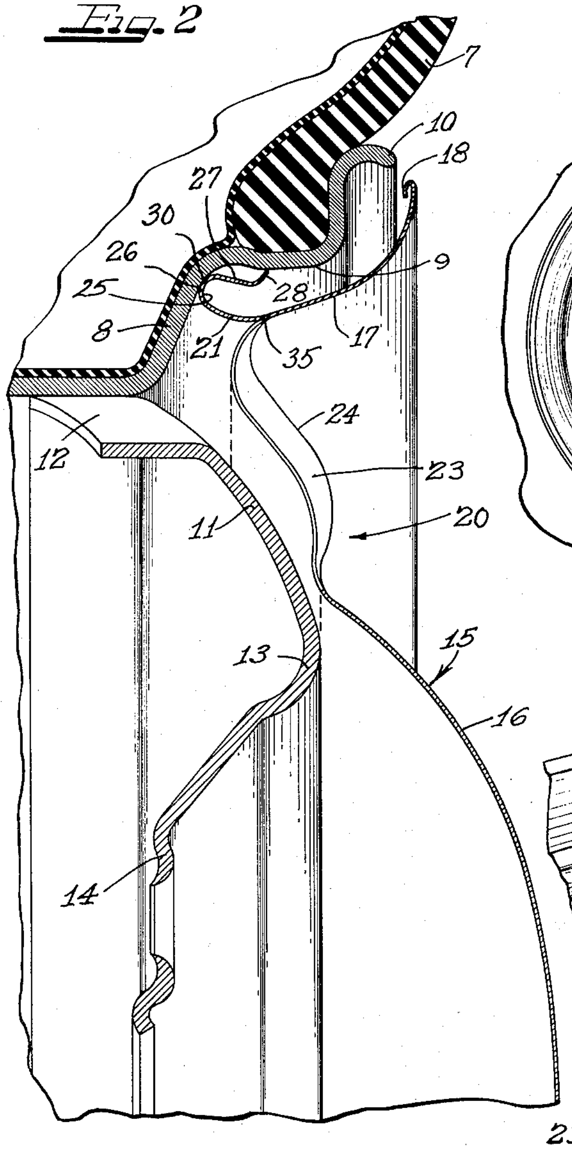
Figure 2 is an enlarged fragmentary cross-sectional view taken on substantially the line II—II of Figure 1 looking in the direction indicated by the arrows.
Figure 1:
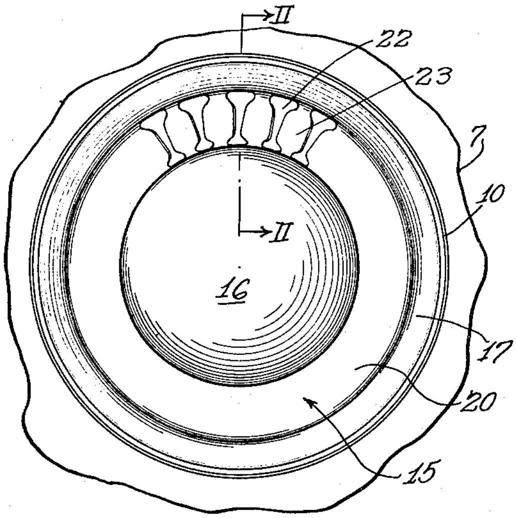
Figure 1 is a fragmentary front view of my novel cover showing the same applied to a wheel.
Figure 3:
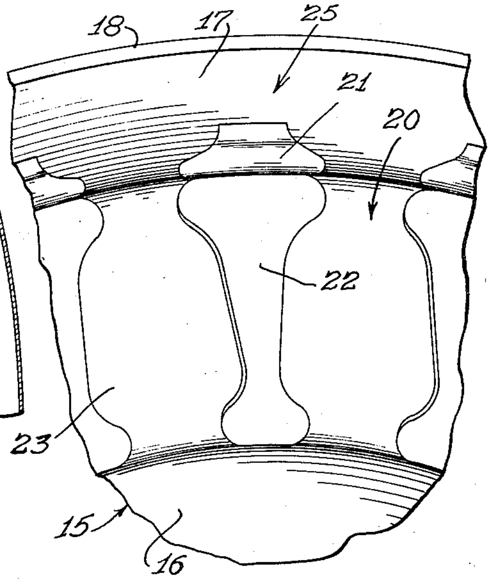
Figure 3 is a fragmentary rear view of a portion of a cover showing how the rearwardly turned fingers alternate with the louvre-like radial spokes.

In the accompanying drawings a more or less conventional type of tire and wheel is shown to which my novel cover is applicable. In this wheel assembly the reference character 10 designates generally the tire and tube mounted in the usual way upon a multi-flange drop center type of tire rim 10 including a generally radially extending flange 8 terminating in an axial flange 9. The rim 10 is fastened in the customary way at spaced intervals to a central wheel body 11 having transverse air openings 12 alternating with the points of attachment of the wheel body to the rim. The wheel body is bulged at 13 and has the usual central inset bolt-on flange 14 by means of which the wheel may be detachably fastened in place on an axle of a vehicle.

Cooperable with the conventional wheel assembly is a sheet metal cover 15 embodying the features of this invention and which includes a central hub or crown part 16 and an outer annular portion 17 terminating in a turned edge 18. This cover also includes an intermediate portion 20 which is generally in divergent relationship with the outer annular portion 17 and connects the central hub part 16 to the portion 17.

The intermediate portion 20 has punched from it at circumferentially spaced intervals turned portions 21 which leave generally radial openings 22 alternating with spoke-like louvre portions 23. In other words, the punching out of the holes 22 serves to define the shape of the spoke-like louvres 23 and also provides material for rearwardly turned portions 21 comprising resilient cover retaining fingers.

Figure 4:
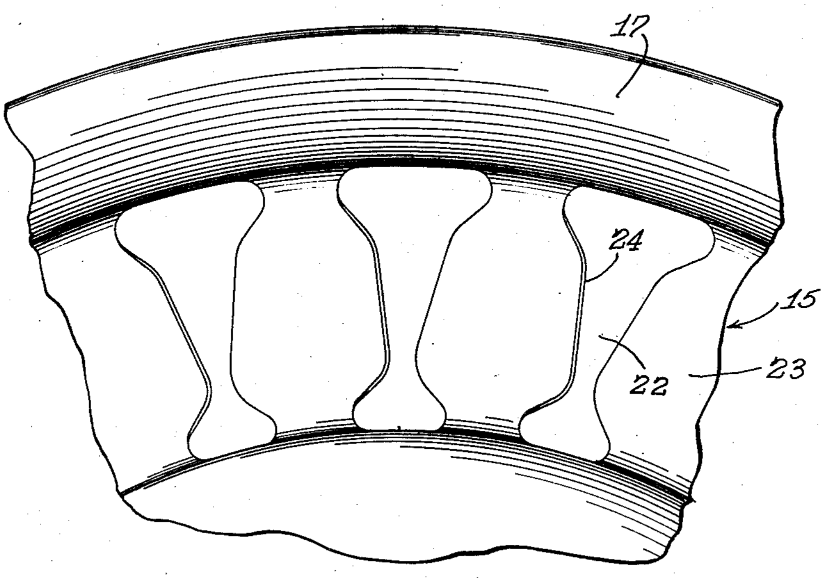
Figure 4 is a fragmentary view similar to Figure 3 but looking at the front of the cover.

As I shall describe more fully hereinafter, each of the spoke-like louvres 23 is skewed so as to present an outer air pick-up edge 24 (Fig. 2 and Fig. 4). In addition, the intermediate portion 20 is of a serpentine-like cross-sectional contour.

Each of the rearwardly turned portions or fingers 21 has an outwardly formed bend 25 adapted to bottom at 26 on the rim flange 8. Also, each turned portion has an axially outwardly turned leg 27 which, in reality, is turned back upon the main body of the portion 21.

This leg 27 terminates in a short stiff angled extremity 28 extending generally radially and axially outwardly for gripping engagement with the rim flange 9.

Figure 5:
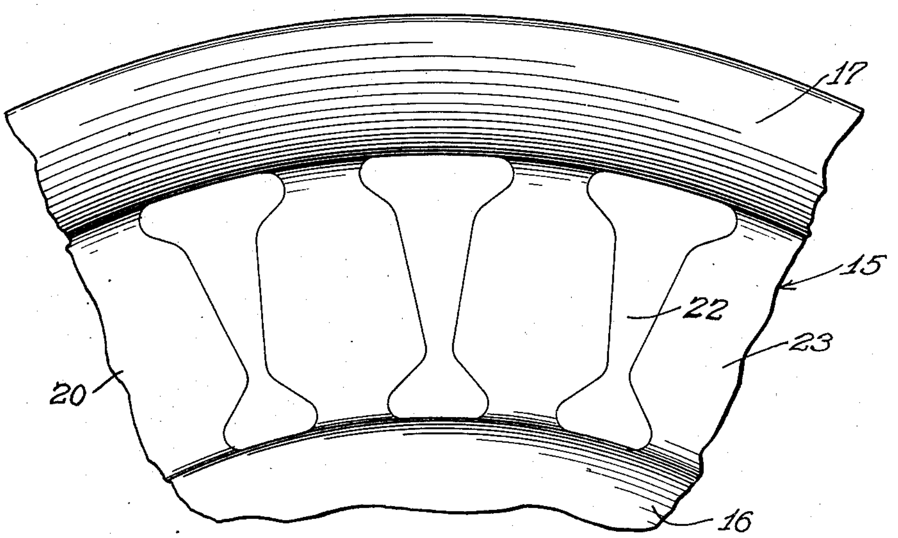
Figure 5 is a view similar to Figure 4 but showing the construction of the louvre-like spokes prior to the skewing of the same by the relative circumferential movement of the outer portion of the cover and the central hub part.

In Figure 5 I have illustrated the construction of the louvre portion of the cover prior to the skewing of the spoke-like louvres 23. This skewing of the louvres may be effected by relatively moving the outer portions of the cover in a circumferential direction relative to the central hub part or portion 16, in accordance with the method covered in my copending application Serial No. 586,619, filed May 22, 1956. I find that by relatively twisting or rotationally displacing the portion 17 with respect to the portion 16, I am enabled, due to the serpentine cross-section of portion 20, to skew the louvres so as to cause them to present outwardly facing air pick-up edges 24. In this the generally hour-glass shape of the slots or openings 22, leaving narrow connecting necks of material between the inner and outer cover portions 16 and 17 and the spoke strips of louvres, substantially facilitates the relative turning or twisting of the cover portions for tilting the substantially wider longitudinal body portions of the spoke-louvre strips intermediate the narrow necks. Through this arrangement, moreover, the finger body portions 21 are of substantially greater width than the leg and tip portions 27 and 28, which is an advantageous relationship in that thereby the legs 27 of the retaining fingers are more readily deflectable resiliently in a radial direction than the more stiffly resilient body portions 21, thus to facilitate the action of the retaining fingers in the application and removal of the cover with respect to the wheel.

In the application of the cover 15 to the wheel, it is first placed over the side of the wheel and then is pressed axially into the wheel. As the cover moves into the wheel the angled finger extremities 28 resiliently yield and slide over the axial rim flange 9 until the finger bends 25 bottom against radial rim flange 8. When in this position the fingers are in tight gripping engagement with the rim flange 9 and are backed up by the reinforcing junction of the fingers with the cover at 35 as shown in Figure 2.

Due to the angle at which the extremity 28 extends relative to rim flange 9 as well as the resilient character of leg 27 of the finger, the finger can yield or give way with a pry-off force applied to the outer edge 18 of the cover thereby enabling the removal of the cover from the wheel without permanent distortion of the retaining fingers.

From the foregoing it is clear that I have provided a very simple and economical way of utilizing material, that would be otherwise waste in forming the cover openings 22, to comprise the cover retaining fingers 21. I am also enabled to provide a structure wherein the fingers will effectively and tightly grip the wheel rim but yet can readily give way when the cover is being pried off the wheel. Excellent results may be obtained by making the cover of this construction from so-called stainless steel sheet or strip stock.

I claim as my invention:

1. In a wheel structure including a wheel body and a multi-flange tire rim including an intermediate generally radially and axially outwardly sloping flange and with openings through the wheel adjacent juncture of the body and rim for air circulation therethrough, a cover for disposition at the outer side of the wheel comprising a body portion for overlying the wheel body and an outer circular portion for overlying the tire rim, a series of openings in said cover at the inner side of said outer annular portion and opposite the wheel openings, with material derived from said openings comprising generally U-shaped retaining spring fingers having axially inwardly directed body leg portions extending as general extensions from said outer annular cover portion and return bent generally axially outwardly extending flexible leg portions of substantial length spaced radially outwardly from said body leg portions and having short and stiff angular generally radially and axially outwardly directed retaining terminals with edges engageable in press-on pry-off slidable relation with the intermediate flange of the tire rim, said edges thrusting radially outwardly with retaining grip against said flange under resilient tension of said legs, the material of the cover between the openings comprising air circulation promoting louvers having the edge portions thereof at one side tilted generally axially outwardly to improve the air circulation function thereof.

2. In a wheel structure including a wheel body and a multi-flange tire rim including an intermediate generally radially and axially outwardly sloping flange and with openings through the wheel adjacent juncture of the body and rim for air circulation therethrough, a cover for disposition at the outer side of the wheel comprising a body portion for overlying the wheel body and an outer circular portion for overlying the tire rim, a series of openings in said cover at the inner side of said outer annular portion and opposite the wheel openings, with material derived from said openings comprising generally U-shaped retaining spring fingers having axially inwardly directed body leg portions extending as general extensions from said outer annular cover portion and return bent generally axially outwardly extending flexible leg portions of substantial length spaced radially outwardly from said body leg portions and having short and stiff angular generally radially and axially outwardly directed retaining terminals with edges engageable in press-on pry-off slidable relation with the intermediate flange of the tire rim, said edges thrusting radially outwardly with retaining grip against said flange under resilient tension of said legs, the material of the cover between the openings comprising air circulation promoting louvers having the edge portions thereof at one side tilted generally axially inwardly to improve the air circulation function thereof.

3. In a wheel structure including a wheel body and a multi-flange tire rim including an intermediate generally radially and axially outwardly sloping flange and with openings through the wheel adjacent juncture of the body and rim for air circulation therethrough, a cover for disposition at the outer side of the wheel comprising a body portion for overlying the wheel body and an outer circular portion for overlying the tire rim, a series of openings in said cover at the inner side of said outer annular portion and opposite the wheel openings, with material derived from said openings comprising generally U-shaped retaining spring fingers having axially inwardly directed body leg portions extending as general extensions from said outer annular cover portion and return bent generally axially outwardly extending flexible leg portions of substantial length spaced radially outwardly from said body leg portions and having short and stiff angular generally radially and axially outwardly directed retaining terminals with edges engageable in press-on pry-off slidable relation with the intermediate flange of the tire rim, said edges thrusting radially outwardly with retaining grip against said flange under resilient tension of said legs, the material between said openings having the respective opposite edges thereof at said openings tilted axially inwardly and axially outwardly to provide air circulation promoting louvers between the cover openings.

4. In a wheel structure including a wheel body and a multi-flange tire rim including an intermediate generally radially and axially outwardly sloping flange and with openings through the wheel adjacent juncture of the body and rim for air circulation therethrough, a cover for disposition at the outer side of the wheel comprising a body portion for overlying the wheel body and an outer circular portion for overlying the tire rim, a series of openings in said cover at the inner side of said outer annular portion and opposite the wheel openings, with material derived from said openings comprising generally U-shaped retaining spring fingers having axially inwardly directed body leg portions extending as general extensions from said outer annular cover portion and return bent generally axially outwardly extending flexible leg portions of substantial length spaced radially outwardly from said body leg portions and having short and stiff angular generally radially and axially outwardly directed retaining terminals with edges engageable in press-on pry-off slidable relation with the intermediate flange of the tire rim, said edges thrusting radially outwardly with retaining grip against said flange under resilient tension of said legs, the material between the cover openings being in the form of generally radial spoke-like portions having the respective opposite edge portions thereof tilted generally axially inwardly and generally axially outwardly and with the entire radial extents of the spoke-like portions of generally serpentine configuration in the radial direction whereby to afford air circulation promoting louvers between the openings in the cover.

References Cited in the file of this patent

UNITED STATES PATENTS

| | | |
|---|---|---|
| Re. 19,467 | Lyon | Feb. 12, 1935 |
| 2,368,237 | Lyon | Jan. 30, 1945 |
| 2,368,238 | Lyon | Jan. 30, 1945 |
| 2,607,633 | Lyon | Aug. 19, 1952 |